(12) United States Patent
Tracey

(10) Patent No.: US 6,789,927 B2
(45) Date of Patent: Sep. 14, 2004

(54) ILLUMINATED FOOT PEG

(76) Inventor: Richard Dale Tracey, 28 3380 Ypres, Windsor, Ontario (CA), L4M 4P8

( * ) Notice: Subject to any disclaimer, the term of this patent is extended or adjusted under 35 U.S.C. 154(b) by 0 days.

(21) Appl. No.: 10/300,621

(22) Filed: Nov. 21, 2002

(65) Prior Publication Data

US 2003/0095414 A1 May 22, 2003

(30) Foreign Application Priority Data

Nov. 22, 2001 (CA) .............................................. 2363345

(51) Int. Cl.[7] .................................................. B62J 6/00
(52) U.S. Cl. ........................ 362/473; 362/545; 362/549; 362/190; 362/253
(58) Field of Search ................................ 362/473, 540, 362/545, 549, 190, 191, 234, 253

(56) References Cited

U.S. PATENT DOCUMENTS

| | | | | |
|---|---|---|---|---|
| 4,797,791 A | * | 1/1989 | Burchick | 362/473 |
| 6,354,723 B1 | * | 3/2002 | Spence | 362/540 |
| 6,398,393 B1 | * | 6/2002 | Perse | 362/473 |

* cited by examiner

*Primary Examiner*—Stephen F Husar

(57) ABSTRACT

A peg, for attachment to a motorcycle, has an attachment lug for mounting it to the motorcycle; a hollow cylindrical body portion rotatably mounted on the attachment lug; a high intensity light source within the body; a window in the body portion with a reflective/refractive lens; an end cap adjustably secured by a pair of bolts, enclosing the body outer end; so that the window aperture may be selectively rotated about the polar axis of the body portion, and secured in a selected orientation. The stainless steel peg body has a ridged brass grip inset into its outer surface and glued in place, to provide a grip for the user's foot.

14 Claims, 2 Drawing Sheets

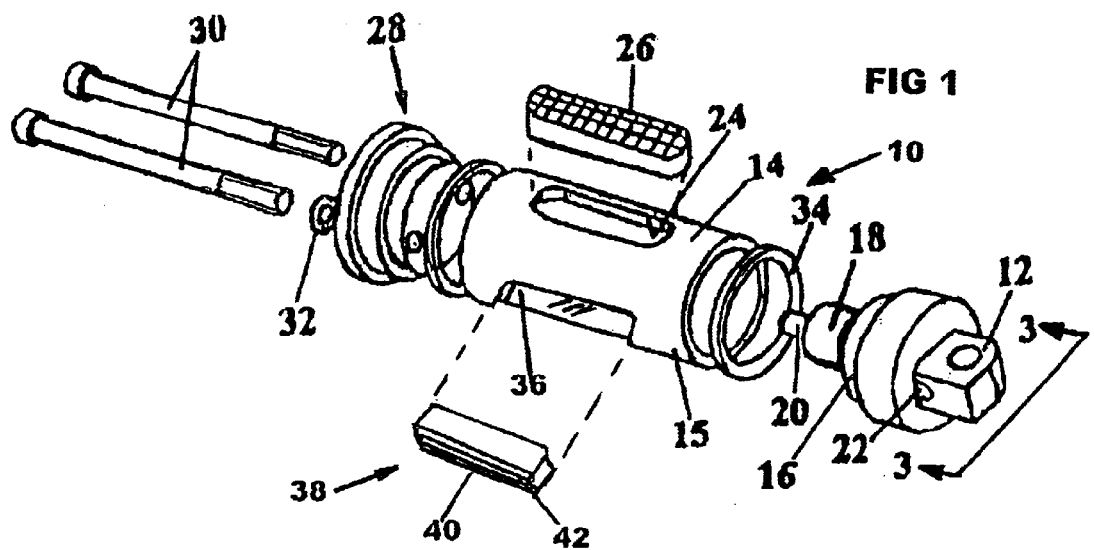
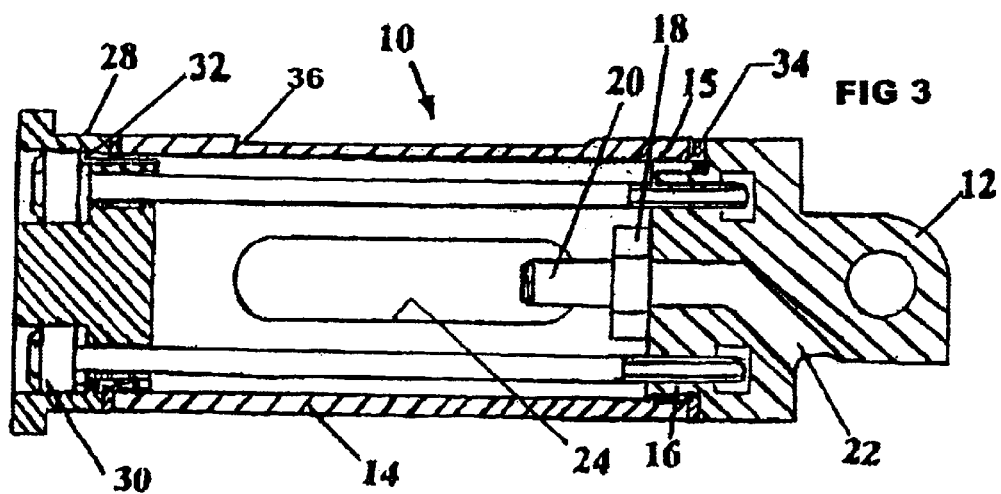

ILLUMINATED FOOT PEG

CROSS-REFERENCE TO RELATED APPLICATIONS

N/A (NOT APPLICABLE)

STATEMENT REGARDING FEDERALLY SPONSORED RESEARCH OR DEVELOPMENT

N/A

REFERENCE TO A SEQUENCE LISTING, A TABLE, OR A COMPUTER PROGRAM LISTING

N/A

COMPACT DISC APPENDIX

N/A

BACKGROUND OF THE INVENTION

1. This invention is directed to a foot peg for use with vehicles such as motor cycles, and in particular to an illuminated foot peg, wherein the peg is adjustable.

2. The provision of an illuminated foot peg for use with motor cycles is known, wherein a substantially cylindrical body of relatively small diameter is secured to the frame of a machine by way of the standard peg lug. This PERCE PERFORMANCE™ peg contains an array of eight light emitting diodes (LED's) shining through a fixed lens, to provide a fixed bank of lights in facing relation with an immovable lens, mounted within an aluminum body machined from solid stock, and serving as dual element clearance lights and turn signals.

BRIEF SUMMARY OF THE INVENTION

The present invention provides a peg for attachment to a vehicle such as a motorcycle, the peg consisting of an attachment lug for securing the peg to the vehicle; a hollow cylindrical body portion having inner and outer ends; the inner end thereof being mounted on the attachment lug; an externally powered light located within the body portion; a window aperture in the body portion extending axially of the body portion; an end cap enclosing the body outer end; and bolt means detachably securing the end cap and body portion to the attachment lug, whereby the window aperture may be selectively rotated about the polar axis of the cylindrical body portion, and secured in a selected orientation. In a preferred embodiment, the bolt means consists of a pair of bolts in threaded engagement with the attachment lug, the bolts being in mutually spaced, parallel relation, extending within the cylindrical body, and parallel to the polar axis of the body.

The peg includes lens means located in sealing relation within the window. The lens may be coloured a desired colour, selected from amber, red and clear.

The provision of two opposed windows, such as a first, forward facing window having an ember lens, and a second, rear-facing window having a red lens, is contemplated.

The above-mentioned light source is preferably a high intensity light source, a halogen light source being the preferred embodiment. The mounting of the light source on the polar axis of the rotatable body portion enables selective positioning of the peg lens in a predetermined, variable angular position, while maintaining substantially constant the emitted illumination. The use of a General Electric 20-watt peanut bulb rated at 320 lumens makes this possible. The peg cylindrical body portion has grip means extending axially along its outer surface, to provide a gripping surface for the foot of a user; the cylindrical body portion having a recess extending axially along its outer surface, to receive the grip means in secured relation therewith. The grip is secured by glue within the recess.

In the preferred embodiment the grip is of metal, having a plurality of longitudinally extending ridges thereon, to provide in use a plurality of transversely extending gripping surfaces for the foot of a user.

In the preferred embodiment the cylindrical body portion is of stainless steel, the grip being of brass.

BRIEF DESCRIPTION OF THE SEVERAL VIEWS OF THE DRAWING

Certain embodiments of the present invention are show, by way of illustration, without limitation of the present invention thereto, other than as set forth in the following claims, reference being had to the drawings, wherein:

FIG. 1 is an exploded view from a first, inner end perspective of the subject peg in partially disassembled relation;

DETAILED DESCRIPTION OF THE INVENTION

Figure 2:
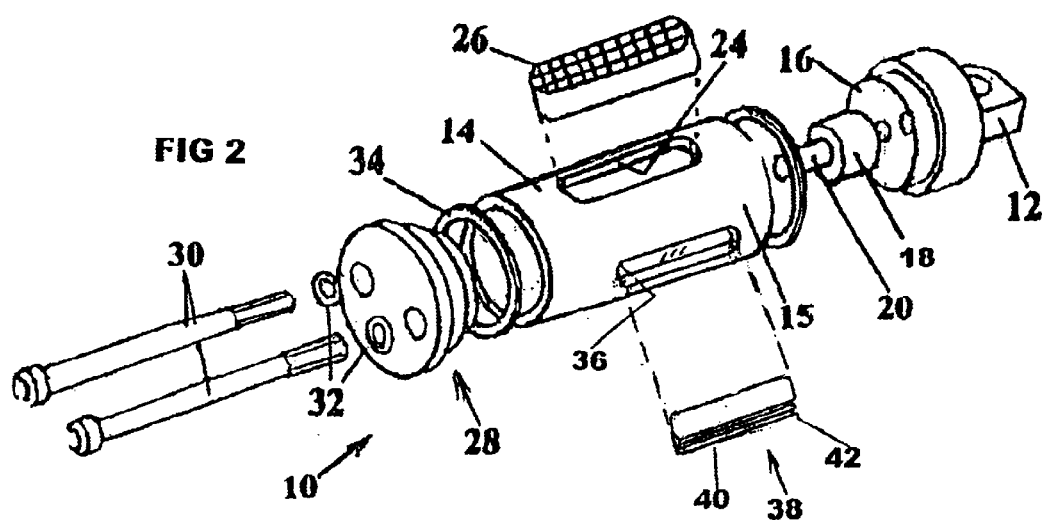
FIG. 2 is a view similar to FIG. 1, taken from a second, outer end perspective; and, FIG. 3 is a diametrical cross section of an assembled peg, taken in a plane corresponding to 3—3 of FIG. 1.

Referring to FIGS. 1, 2 and 3, a peg assembly 10 has an attachment lug 12 for mounting the peg, as to the standard mounting lug of a motorcycle (not shown).

A hollow cylindrical body portion 14 has an inner end 15 that fits over a boss portion 16 of the lug 12, by way of a sliding fit, to permit rotational repositioning of the body portion 14, relative to the lug 12.

A bulb housing 18 extends from the lug 12, being illustrated with a high intensity lamp 20, the preferred embodiment comprising a 12-volt 20 watt "peanut" halogen light bulb.

An outlet aperture 22 in the lug 12 provides access for direct wiring connections (not shown) with a motorcycle electrical system.

The body portion 12 has a window aperture 24 with a lens 26 inserted in sealing relation therein. A multi-faceted reflective/refractive plastic lens is preferred.

A distal end cap 28 encloses the body portion 14, being adjustably secured by bolt means consisting of two stainless steel bolts 30, the threaded ends of which are screwed into the lug 12. Lock washers 32 secure the bolts 30 when the bolts 30 are tightened.

The ends of the body portion 14 are sealed by way of O-rings 34.

The body portion 14 has a shallow outer groove 36 extending axially therealong, which anchors a boot grip.38. The boot grip 38 has a serrated outer surface 40, comprising a plurality of longitudinal ridges 42. The preferred brass grip 38 is glued into the groove 36, using an appropriate LOC-TITE (TM) thread-gripping formulation.

In FIG. 3 the window aperture 24 is indicated in phantom, for purposes of illustrating its position relative to the light 20.

A theoretical assessment of the strength of the subject peg, was carried out, based upon the peg embodiment incorporating a single window and two stainless steel bolts of ¼ inch diameter. The specified minimum static load was 500 pounds; the assumed safety factor was one. With an accepted yield stress for stainless steel of 80 Kips (80,000 p.s.i.,) the factored tensile capacity per ¼" bolt is 2300 pounds.

The peg body portion being of stainless steel, and with its inserted end fittings has a specified ultimate load of 1600 pounds, at unity safety factor.

On this basis, with failure anticipated to occur by bolt tensile failure or thread pull-out, with consequent transfer of the load to the peg body, at an assumed failure at 75% of the ultimate load, this gives an upper load limit of 1200 pounds.

The foregoing assessment does not consider factors such as the orientation of the angularly adjustable peg body portion; impact loading, and the effects of interaction between the bolts and the components of the peg body and its end fittings.

However, it it is clear that the specified 500 pound minimum load is well met.

What is claimed is:

1. A peg for attachment to a vehicle, consisting of an attachment lug for securing the peg to the vehicle; a hollow cylindrical body portion having inner and outer ends; the inner end thereof being mounted on the attachment lug; a battery powered light source located within the body portion; a window aperture in the body portion extending axially of the body portion; an end cap enclosing the body outer end; bolt means adjustably securing the end cap and body portion in rotatably adjustable relation with the attachment lug, whereby the window aperture may be selectively rotated about the polar axis of the cylindrical body portion, and secured in a selected orientation.

2. The peg as set forth in claim 1, including lens means located in sealing relation within said window.

3. The peg as set forth in claim 2, wherein said light source is a high intensity light source.

4. The peg as set forth in claim 3, wherein said light source is a halogen light source.

5. The peg as set forth in claim 1, wherein said cylindrical body portion has grip means extending axially along an outer surface portion thereof, to provide a gripping surface for the foot of a user.

6. The peg as set forth in claim 5, wherein said cylindrical body portion has a recess extending axially along an outer surface portion thereof, to receive said grip in secured relation therewith.

7. The peg as set forth in claim 6, wherein said grip is secured in glued relation therewith.

8. The peg as set forth in claim 5, wherein said grip is of metal, having a plurality of longitudinally extending ridges thereon, to provide in use a plurality of gripping surfaces for the foot of a user.

9. The peg as set forth in claim 1, wherein said cylindrical body portion is of stainless steel.

10. The peg as set forth in claim 8, wherein said cylindrical body portion is of stainless steel, and said grip is of brass.

11. The peg as set forth in claim 2, including lens means located in sealing relation within two said windows.

12. The peg as set forth in claim 2, wherein said lens means is selected from the group consisting of amber, red and clear lenses.

13. A peg for attachment to a motorcycle, consisting of an attachment lug for securing the peg to the motorcycle; a hollow cylindrical body portion having inner and outer ends; the inner end thereof being mounted on the attachment lug; a battery powered light source located within the body portion; positioned substantially coincident with the polar axis thereof; a window aperture in the body portion extending axially of the body portion; an end cap enclosing the body outer end; bolt means adjustably securing the end cap and body portion in rotatably adjustable relation with the attachment lug, whereby the window aperture may be selectively rotated about the polar axis of the cylindrical body portion, and secured in a selected orientation, while maintaining substantially constant the light emited therethrough.

14. The peg as set forth in claim 13, including lens means located in sealing relation within said window; said lens means being a multi faceted reflective/refractive lens.

* * * * *